United States Patent Office
3,421,852
Patented Jan. 14, 1969

3,421,852
PROCESS FOR TREATMENT OF ALUMINOUS ORES FOR PRODUCTION OF PURIFIED ALUMINUM OXIDE
Rene Perieres, La Tronche, and Yves de Bard, Grenoble, France, assignors to Pechiney—Compagnie de Produits Chimiques et Electrometallurgiques, Paris, France
No Drawing. Filed Aug. 8, 1966, Ser. No. 570,684
Claims priority, application France, Aug. 10, 1965, 27,826
U.S. Cl. 23—142  8 Claims
Int. Cl. C01f 7/02

This invention relates to a process for the production of purified aluminum oxide from aluminous ores, that is, ores containing aluminum in the form of the oxide or other combined forms.

It is known that the silica present in aluminuous ores, in which the amount of iron impurities is small in relation to the siliceous impurity content, can be eliminated by treating the ore with carbon in a suitable proportion in order to reduce the iron oxides to metallic iron and then to reduce the silica to volatile silicon monoxide which is liberated. The treatment is usually carried out at a temperature in the range of 1200° to 1500° C. In this way, it is possible to obtain an aluminum oxide which is substantially free of silicon but which contains most of the iron and all of the titanium originally present in the ore. The silica is difficult to eliminate when the iron impurity content of the aluminous ore is large by comparison with the content of siliceous impurities.

It is also known that aluminous ores can be treated with blende (ZnS) at temperatures in the range of 1350° to 1400° C. in which the carbon is employed in an amount corresponding to two gram-atoms and the zinc sulphide in the amount of one mol per mol of silica present in the aluminuous ore. Under these conditions, the silica is essentially converted to volatile silicon monosulphide which is liberated while the zinc is distilled.

Unfortunately, the iron and titanium originally present in the ore remain in the product after treatment by the process described. In addition, there is the further disadvantage that a relatively expensive material such as blende is required as a raw material and which gives rise to further serious complications in the process. The blend can be replaced by pyrites, but then iron is introduced as an additional impurity.

In another known process for the purification of bauxites, most of the iron and titaniferous impurities can be eliminated. In this process, the oxides of iron and titanium, which contaminate the bauxite, are converted to sulphide derivatives by heating the bauxite to a temperature above 445° C. in the presence of sulphur. The sulphur is employed in a slight excess in relation to the iron present. After sulphurization, the product is subjected to the action of gaseous chlorine at a temperature within the range of 275° to 920° C. The end product is thus deprived of most of the iron in which more than 90% has been eliminated. A large proportion of titanium, such as between 50% and 70%, is also eliminated.

The disadvantage of this process is that it is accompanied by loss of alumina usually in an amount within the range of 6% to 10% by weight and the process cannot be used to eliminate silica present because the alumina is eliminated at the same time as the silica in which the percentage of alumina removed (with regard to the amount originally present) is always fairly close to the percentage of silica removed (with regard to the amount of silica originally present).

It is an object of this invention to provide a process for the purification of aluminous materials and which eliminates all or the greatest part of the silica and which, if desired, eliminates practically all of the titanium as well as the iron oxide, and which retains practically all of the alumina originally present.

The invention relates to a process for the production of solid alumina impoverished in impurities of iron, silicon and titanium present either in elementary or in combined form. In accordance with the practice of this invention, the aluminous material containing silica, iron oxide and titanium oxide is treated with carbon in the presence of sulphur at elevated temperature. In the process of the invention, the aluminous material is treated with carbon and sulphur at a reaction temperature which is raised gradually from a minimum within the range of 200° to 1000° C. to a maximum temperature within the range of 1200° to 1500° C. and preferably to a maximum within the range of 1200° to 1300° C.

The amount of carbon employed is preferably 1 to 1.25 times the amount calculated to reduce the oxides of iron, silicon and titanium present to their elementary state with the carbon being converted to carbon monoxide. The amount of sulphur employed is at least equal to the amount required to convert the silicon present to silicon monosulphide and is at most equal to 1.6 times the quantity required to convert the silicon, iron and titanium to their corresponding higher sulphides, with the oxygen fixed to the iron and titanium being eliminated in the form of sulphur dioxide.

The sulphur may be employed in the combined state and/or the free state. Sulphurous cokes may be used, in which event the sulphur combined with the carbon can be employed advantageously to provide the reaction with at least part of the amount of sulphur required. If all the sulphur needed is supplied in the form of sulphurous coke, the minimum reaction temperature for the treatment in the range of 1200° to 1350° C.

An aluminous ore, such as bauxite, may be used as the aluminous raw material. It may be preferred, depending somewhat upon the iron oxide content of the ore, to pretreat to reduce this mineral, either partly or completely, by any known reducing agents, such as hydrogen, carbon or carbon monoxide. It is possible, in this way, to obtain an intermediate product which may be used as the aluminuous starting material in the process of this invention.

In calculating the minimum quantity of carbon required for carrying out the process, part or all of the sulphur required to reduce the iron and titanium oxides to the metallic state, in which the oxygen of the oxides is eliminated as sulphur dioxide, may be calculated as carbon or as equivalent to carbon. It may be pointed out that in calculating the minimum amount of carbon required, the sulphur cannot replace carbon in the reduction of the silicon oxide.

If either the carbon or the sulphur is employed in quantities less than the minimum quantities, as defined above, elimination of the metal impurities becomes incomplete.

The sulphur may be added to the mixture of aluminous material and carbon and/or introduced after the carbothermic reaction has been initiated. It may be introduced in a solid or in a vaporous form.

It may be desirable to incorporate iron into the impure aluminous material for purposes of facilitating the elimination of impurities such as silicon, titanium and their oxides. For this purpose, the iron can be incorporated in its elementary or in its combined state, such as the oxide or sulphide.

The solid starting materials are intimately mixed and used either in bulk form or in the form of agglomerates.

The reaction is carried out in a non-oxidizing or reducing atmosphere, such as in the presence of an inert gas such as nitrogen, or in the presence of a reducing gas, such as carbon monoxide, etc. Treatment may be terminated or completed under vacuum conditions.

The reducing treatment may be carried out either continuously or in batches, in a fixed bed or in a fluidized bed, or in a moving bed of the type formed in a rotary furnace.

One of the main advantages of the reducing treatment of this invention is to prevent the powdered charge from becoming sintered. As a matter of fact, it has been found that when sulphur is used, practically no sintering will take place within the reaction temperature ranges decribed.

On the other hand, in the absence of sulphur, a distinct sintering frequently occurs at temperatures beginning with 1200° C. With specially selected raw materials, it is possible to carry out the reducing treatment of the invention at a temperature up to 1500° C. without noticing any sintering of the charge. Optimum results are secured when the reduction reaction is carried out at a temperature below 1350° C. as a preferred range.

When the temperature is maintained within the preferred range, the reduction reaction can be very efficiently performed notwithstanding the fact that these temperatures are extremely low for this type of reduction. In addition, the maintenance of the preferred temperature range makes it possible practically to avoid sintering of any of the charge of the aluminous raw material whereas the risk of sintering becomes very noticeable when the temperature rises above 1350° C. In addition, by working below 1350° C., the technology of the furnace can be substantially simplified. Loss of aluminum in the process of this invention occurs primarily by way of powders which become entrained with the gases, but which can be recovered by suitable separators to minimize such losses.

In accordance with a preferred practice of this invention, the described purifying reduction with carbon and sulphur is followed by a complementary operation in which the product resulting from the reduction step is subjected to the action of gaseous chlorine at a temperature within the range of 200° to 900° C. and preferably 500° to 700° C. The treatment with chlorine is advantageously carried out with chlorine diluted with nitrogen or other inert gas in the ratio of 5 to 15 volumes of nitrogen per volume of chlorine. This enables improvement in the selectivity of the chlorine in its action on the impurities. Chlorination is generally continued until elimination of the impurities practically ceases. Its duration will depend somewhat on the quality of the starting material.

It has been found that, by reason of the presence of sulphur in the carbothermic treatment, the ferruginous (iron oxide and other combined forms of iron), titaniferous (titanium oxide and other combined forms of titanium), and siliciferous (silicon oxide and other combined forms of silicon) impurities become more sensitive to the action of chlorine, i.e. they become able to be eliminated by chlorine more readily and/or more completely and/or at a lower temperature by comparison with the absence of sulphur. This greater sensitivity to the action of chlorine, as a result of the carbothermic treatment in the presence of sulphur, is one of the important concepts of this invention.

As has previously been pointed out, another important feature of the invention resides in the ability effectively to eliminate not only the oxides of iron but also those oxides in which the thermodynamic and chemical activity is fairly similar to that of aluminum oxide, as is the case with silicon oxide and particularly titanium oxide, without any appreciable losses of aluminum oxide.

Another important feature of the preferred practice of this invention resides in the two-stage treatment in which not only the iron and titanium but also any silicon which remains in the product after the first stage of reduction by carbon and sulphur, are selectively eliminated during the chlorination stage, leaving the aluminum oxide practically unaffected.

The loss of aluminum, in the process of this invention, will not exceed 3% and is generally less than 1% down to no calculable loss. By way of comparison, the systematic loss of alumina in the form of insoluble silicate which accompanies the production of alumina from bauxite by the Bayer process exceeds 1 part by weight of alumina per part by weight of silica present in the ore.

After the chlorination treatment, the alumina obtained may have some carbon left from the excess of carbon used in the first stage of treatment. It is possible, according to an aspect of this invention, selectively to oxidize the remaining carbon without affecting the alumina. This can be achieved by contact with an oxidizing gas, such as air, which may optionally be diluted with an inert gas, at a temperature below 1500° C. and preferably below 1000° C. but not less than 600° C.

When it is desired to produce a particularly pure aluminum oxide, purification should be effected by the reduction embodying the features of this invention followed by the described chlorination treatment in successive steps. The aluminum oxide obtained will have an alumina content of at least 99% by weight and more often better than 99.8% to 99.9% by weight. Within these limits, the ultimate purity of the aluminum oxide will depend somewhat upon the impurities in the starting material.

The following Examples 1 to 8 are given by way of comparison and not by way of limitation, to illustrate the advantages resulting from the invention. Examples 1 to 4 do not represent the practice of this invention, while Examples 5 to 9 do represent the practice of the invention. All of the tests were carried out with the same batch of bauxite derived from the WEIPA deposit in Australia. Tests carried out with the ferruginous bauxites from Brignoles in France confirmed the general scope of the invention. After calcination at 800° C., the WEIPA bauxite used in the examples have the following mean gravimetric composition: 40.86% Al, 2.21% Si, 6.84% Fe, 2.02% Ti.

In accordance with Examples 1 and 2, a finely crushed or powdered mixture of 100 parts by weight of bauxite and 5 parts by weight of carbon was mixed and maintained for a period of 8 hours at a temperature of 1200° C. (in Example 1) and 1500° C. (in Example 2). The operation is carried out in a muffle furnace flushed with nitrogen. The product obtained in Example 1 remained powdered while the product of Example 2 underwent marked sintering with the result that it had to be crushed again before subsequent use.

In Examples 3 and 4, the products prepared in accordance with Examples 1 and 2 were subjected to the action of a mixture of 10 volumes of nitrogen and 1 volume of chlorine at 650° C. for a period of 6 hours in a horizontal muffle furnace of silica.

In Examples 5 and 6, the working conditions with respect to the quantities of bauxite and carbon used, the nitrogen flushing, the reducing temperature and the apparatus are the same as in Examples 1 and 2. In Examples 5 and 6 sulphur was incorporated in the mixture of carbon and bauxite in an amount of 7.5 parts by weight of sulphur per 100 parts by weight of bauxite. The time of treatment was reduced from the 8 hours of Examples 1 and 2 to but 1 hour in Examples 5 and 6. No sintering occurred in Examples 5 and 6.

In Examples 7 and 8, representing the preferred practice of this invention, the reducing conditions were identical with those used in Examples 5 and 6, respectively. In Examples 7 and 8 the products prepared by the reductions corresponding to Examples 5 and 6 were subjected to chlorination under the same working conditions as those used in Examples 3 and 4.

An additional Example 9 identical to Examples 7 and 8 was carried out except that the temperature of the treatment with carbon and sulphur was 1340° C. instead of 1200° C. in Example 7 or the 1500° C. in Example 8.

TABLE I

| | Examples | | | |
|---|---|---|---|---|
| | 1 | 2 | 3 | 4 |
| Temperature (° C.) | 1,200 | 1,500 | 1,200 | 1,500 |
| Si: | | | | |
|   Residual Si (percent) | 2.48 | 0.95 | 1.86 | 0.77 |
|   Si eliminated (percent) | 0 | 64 | 20.8 | 72.8 |
| Fe: | | | | |
|   Residual Fe (percent) | 7.61 | 7.11 | 3.26 | 2.30 |
|   Fe eliminated (percent) | 0 | 12 | 61 | 74.2 |
| Ti: | | | | |
|   Residual Ti (percent) | 2.26 | 2.36 | 1.21 | 1.15 |
|   Ti eliminated (percent) | 0 | 0 | 51 | 56.15 |
| Al: | | | | |
|   Al eliminated (percent) | 0 | 0 | 0.2 | 0.3 |

TABLE II

| | Examples | | | | |
|---|---|---|---|---|---|
| | 5 | 6 | 7 | 8 | 9 |
| Temperature (° C.) | 1,200 | 1,500 | 1,200 | 1,500 | 1,340 |
| Si: | | | | | |
|   Residual Si (percent) | 0.60 | 0.30 | 0.15 | 0.05 | 0.08 |
|   Si eliminated (percent) | 76.6 | 88.5 | 95.73 | 98.25 | 97.5 |
| Fe: | | | | | |
|   Residual Fe (percent) | 7.1 | 7.1 | 0.06 | 0.02 | 0.03 |
|   Fe eliminated (percent) | 10.3 | 11.8 | 99.32 | 99.77 | 99.65 |
| Ti: | | | | | |
|   Residual Ti (percent) | 2.34 | 2.38 | <0.01 | <0.01 | <0.01 |
|   Ti eliminated (percent) | 0 | 0 | >99.62 | >99.62 | 99.62 |
| Al: | | | | | |
|   Al eliminated (percent) | 0 | 0 | 0.3 | 1.2 | 0.8 |

The aluminum oxide content of the products corresponds to the balance to make up 100%, after taking into account a residual carbon content of 0.05% to 0.2%.

In comparison of the preceding examples, it will be seen that the treatment in the absence of sulphur, followed by chlorination, as in Examples 3 and 4, gives better results than the same treatment without chlorination, as in Examples 1 and 2, but gives much poorer results than treatment representative of the practice of this invention, as in Examples 7 and 8, and 9.

Comparison between Examples 7, 8 and 9 and Examples 3 and 4 show very clearly that purification is not only markedly improved but that it is possible to work at substantially lower temperatures.

It is possible to replace the chlorine by other chlorinating agents or compounds capable of liberating chlorine in the chlorination reaction.

It will be understood that changes may be made in the details of formulation and operation without departing from the spirit of the invention, especially as defined in the following claims.

We claim:
1. A process for the production of solid alumina impoverished in impurities of silicon, iron and titanium, in elementary or in combined form, from an aluminous raw material containing such impurities comprising adding carbon and sulphur to aluminous raw material and heating at a temperature which is raised gradually from a minimum within the range of 200° to 1000° C. to a maximum within the range of 1200° to 1500° C., in which the amount of carbon is 1 to 1.25 times the theoretical amount required for reduction of the oxides of silicon, iron and titanium to be eliminated and in which the sulphur is present in an amount at least equal to the amount required to convert the silicon to be eliminated to silicon monosulphide but less than 1.6 times the amount necessary to convert the silicon, iron and titanium to their corresponding higher sulphides.

2. The process as claimed in claim 1 in which the maximum temperature for reaction is within the range of 1200° to 1350° C.

3. The process as claimed in claim 1 in which the carbon is converted during the reaction to carbon monoxide.

4. The process as claimed in claim 1 in which the oxygen fixed to the iron and titanium in the raw material is converted for elimination to sulphur dioxide.

5. The process as claimed in claim 1 which includes the step of chlorinating the product of claim 1 at a temperature within the range of 200° to 900° C.

6. The process as claimed in claim 5 in which the chlorination reaction is carried out at a temperature within the range of 500° to 700° C.

7. The process as claimed in claim 5 in which the chlorination reaction is carried out with chlorine gas.

8. The process as claimed in claim 5 in which the chlorination reaction is carried out with a compound capable of releasing chlorine under the reaction conditions.

References Cited
UNITED STATES PATENTS

| | | | |
|---|---|---|---|
| 1,245,383 | 11/1917 | Richmond | 23—142 |
| 1,569,483 | 1/1926 | Haglund | 23—142 |
| 1,772,936 | 8/1930 | Haglund | 23—142 |
| 1,785,464 | 12/1930 | Suzuki et al. | 23—142 |
| 2,141,444 | 12/1938 | Nordberg | 23—142 |
| 3,009,778 | 11/1961 | Tardieu et al. | 23—142 |
| 3,216,794 | 11/1965 | Roschuk | 23—142 |

OSCAR R. VERTIZ, *Primary Examiner.*

G. T. OZAKI, *Assistant Examiner.*

UNITED STATES PATENT OFFICE

CERTIFICATE OF CORRECTION

Patent No. 3,421,852                 January 14, 1969

Rene Perieres et al.

It is certified that error appears in the above identified patent and that said Letters Patent are hereby corrected as shown below:

Column 2, line 35, "the range of 1200° to 1350° C." should read -- ment should be in the range of 1000° C. --.

Signed and sealed this 24th day of March 1970.

(SEAL)
Attest:

Edward M. Fletcher, Jr.            WILLIAM E. SCHUYLER, JR.
Attesting Officer                  Commissioner of Patents